United States Patent [19]
Kreuzer

[11] 3,981,053
[45] Sept. 21, 1976

[54] TWO-PART WORM DRIVE CLAMP WITH VARIABLE LENGTH BAND-FORMING PART

[75] Inventor: Laurence G. Kreuzer, Des Plaines, Ill.

[73] Assignee: DuPage Manufacturing Company, Downers Grove, Ill.

[22] Filed: Oct. 8, 1975

[21] Appl. No.: 620,698

[52] U.S. Cl.............................. 24/274 R; 24/20 EE
[51] Int. Cl.².......................................... B65D 63/02
[58] Field of Search ............ 24/274, 20 CW, 20 EE, 24/23 EE, 281, 284, 285, 286, 20 R, 201 A, 201 BN, 206 A

[56] References Cited
UNITED STATES PATENTS

| | | | |
|---|---|---|---|
| 229,699 | 7/1880 | Hale............................. | 24/20 EE X |
| 924,710 | 6/1909 | Wheildon........................ | 24/201 A |
| 2,646,940 | 7/1953 | Volz............................. | 24/20 EE X |
| 3,087,220 | 4/1963 | Tinsley.......................... | 24/274 R |
| 3,510,918 | 5/1970 | Oetiker......................... | 24/20 CW UX |
| 3,769,665 | 11/1973 | McKown.......................... | 24/274 R |
| R14,503 | 8/1918 | Swaidmark ...................... | 24/281 |

FOREIGN PATENTS OR APPLICATIONS

| | | | |
|---|---|---|---|
| 710,600 | 6/1931 | France........................... | 24/206 A |
| 293,009 | 12/1953 | Switzerland...................... | 24/201 A |

Primary Examiner—Donald A. Griffin
Attorney, Agent, or Firm—Norman H. Gerlach

[57] ABSTRACT

A two-part worm drive clamp embodying a first part in the form of a tensioning strip having a housing-enclosed, slack take-up worm at one end and a tab at its other end, and a second part in the form of a ribbon-like, band-forming strip having a tab-receiving cut-out or opening at one end and a longitudinal series of generally transverse, worm-engaging slots extending inwardly from its other end. The desired size of the clamp is attained by wresting the second part from a tandem or one-in-front-of-the-other array of unit band lengths in a roll of preformed band-forming stock, the requisite number of unit lengths being dependent upon the required size of the band of the clamp. An important feature of the invention resides in the nature of the interlock which is established between the tab and the tab-receiving opening, the interlock being such that it is unnecessary angularly to displace either part in order either to effect or disconnect the interlock.

6 Claims, 9 Drawing Figures

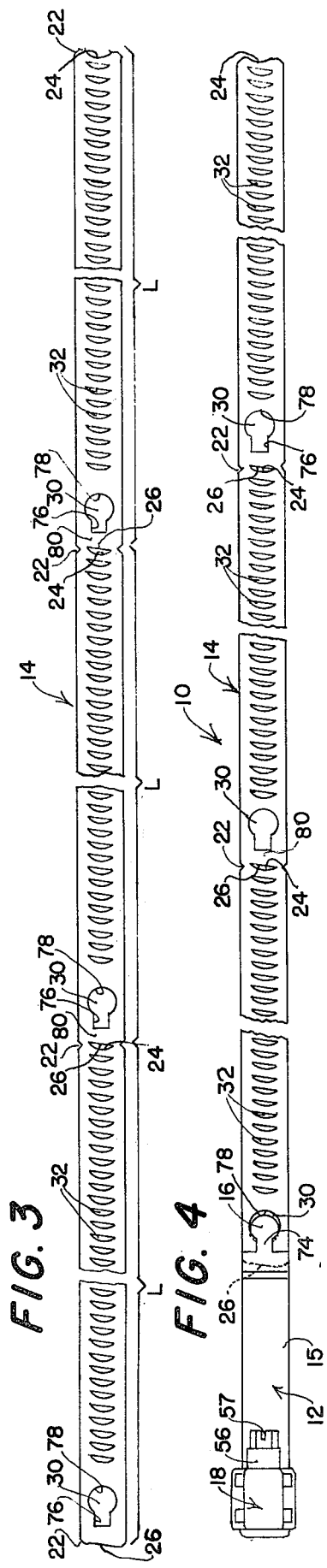

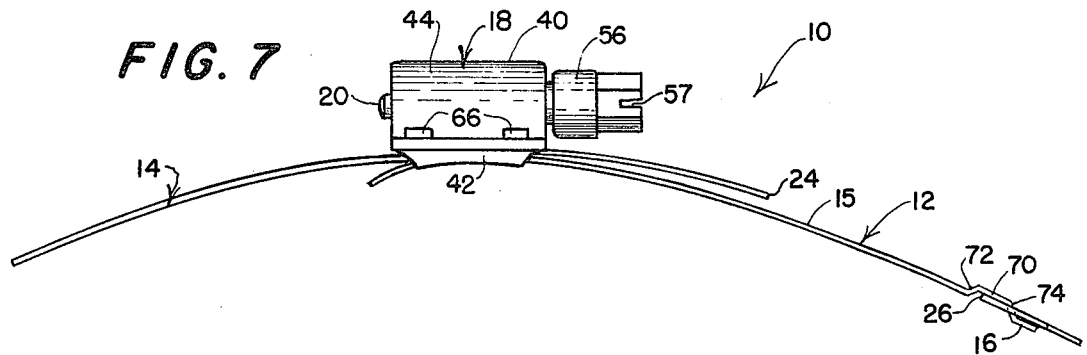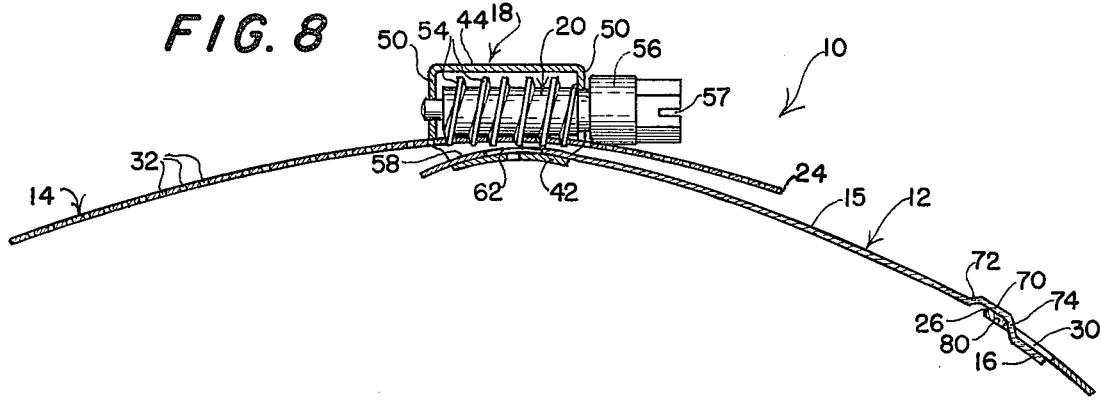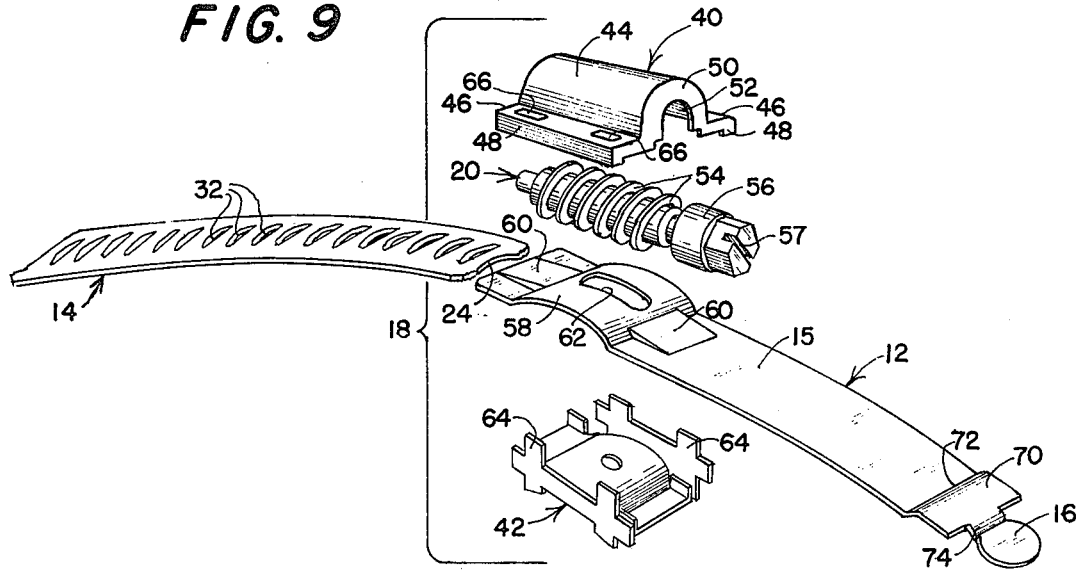

3,981,053

TWO-PART WORM DRIVE CLAMP WITH VARIABLE LENGTH BAND-FORMING PART

The improved worm drive clamp comprising the present invention is designed for use primarily as a hose clamp of the general type which is used in association with automotive hose connections leading to automobile radiators, cylinders blocks, water pumps, air conditioning units, power steering or power brake apparatus and the like, as well as in other fields where it is necessary to shrink one end of a flexible or resilient hose on a tubular connection or upon another tube as, for example, a stove pipe sealing purposes. The present clamp is, however, capable of other uses and the same may, if desired and with or without modification as required, be employed in connection with the banding or strapping of a wide variety of articles such as boxes, cartons and the like, regardless of whether the articles be of circular, rectangular, or other configuration. Irrespective of the particular use to which the invention may be put, the essential features thereof are at all times preserved.

In the banding of articles, particularly in the packaging field, as well as in automotive repair shops, it has heretofore been necessary to maintain a large inventory of worm drive clamps of many different sizes in order to accommodate articles of different sizes. In order to select a clamp of proper size for a given article, it is frequently necessary to resort to measurement of the circumference of the article to be banded and then selection of a clamp with a bank of commensurate length. These are time-consuming operations, especially where unskilled or inexperienced labor is involved. Additionally, in the automotive industry as well as in connection with hydraulically-operated equipment, hose or other fluid-line connections frequently require either replacement or release for purposes of repair work, with a conventional one-part worm drive clamp it is necessary completely to disengage the worm of the clamp from the associated end of the clamp band in order to remove the clamp as a whole from the part on which the clamp is installed and then later on to reinstall the clamp. In the application of a worm drive clamp to an article such as a hose connection, the greatest difficulty involved is the initial "threading" or feeding of the free end of the band of the clamp to the housing-enclosed tensioning worm. This is particularly true when working in tight places. Thus, in connection with numerous repair jobs, considerable time is lost by the workman in endeavoring to thread the free end of the band of a worm drive clamp to the worm in such proper fashion that turning of the worm will effect the necessary shrinking of the band upon the hose or other article which it encircles.

The present invention is designed to overcome the above-noted limitations that are attendant upon the construction and use of conventional one-part worm drive clamps and, toward this end, the invention contemplates the provision of a two-part worm drive clamp in which one of the parts is employed as a tensioning or slack take-up member, while the other part is employed as a filler or body member in order to supply the necessary bulk length to such part as a whole. More specifically, the present worm drive clamp embodies a first part which is in the form of an elongated but relatively short ribbon-like strip having a tensioning worm at one end and a tab at the other end. A second part, which is formed from ribbon-like stock and constitutes the band of the clamp, has a tab-receiving cutout or opening adjacent to one of its ends while a longitudinal series of generally transverse worm-engaging slots extends inwardly from its other end. The second part is comprised of one or more unit lengths which may be wrested from a roll of the band-forming stock in accordance with the desired size of the article undergoing banding. Each unit length has a tab-receiving cut-out or opening adjacent to one end thereof while a longitudinal series of the generally transverse worm-engaging slots extends inwardly from its other end. Thus, no matter how many unit lengths may be wrested from the roll of band-forming stock, the resultant multi-length part will present the necessary tab-receiving cut-out or opening at its trailing end and the necessary worm-engaging slots extending inwards from its other end. Thus, in effecting any given clamp installation, after the size of an article to be banded is roughly estimated, the required number of unit lengths to accommodate such size may be wrested from the roll of band-forming stock, the tab at the trailing end of the thus detached part interlocked with the tab of the tensioning part, and the leading end of the detached part caused to be engaged by the housing-enclosed tensioning worm which forms an element of the tensioning part of the clamp. In this manner, inventory hunting and individual clamp selection are eliminated.

Although a multiple part worm drive clamp which embodies a single slack take-up or tensioning part having a locking tab at one end and a tensioning worm at its other end is known in the clamp art, such a clamp is designed so that unfastening thereof must necessarily be accomplished by unthreading from the worm the adjacent end of the band-forming part of the clamp. This necessitates rethreading the worm and said adjacent end of the band-forming part when the clamp is again installed. The reason why such a clamp must be separated in the immediate vicinity of the worm is that the intermediate interlocks between adjacent parts embody tab and opening connections wherein the tabs must be inserted in the slots in edgewise fashion and this necessitates placing one of the two clamp parts under torsion, that is, in a 90° or so angular position with respect to the other clamp part. To do this while the worm and adjacent parts are still coupled together is not possible and, thus, installation or reinstallation of the clamp as a whole is always subject to the difficult task of initially aligning the two parts and then attempting to effect a threaded connection therebetween. As previously stated, this is particularly difficult when working in tight quarters.

The present invention also obviates this latter limitation that is attendant upon the construction and use of any previously known multi-part worm drive clamp and, accordingly, the invention contemplates the provision between adjacent clamp parts of a tab and opening connection wherein the interlock may be effected as well as disconnected by initially establishing a slight overlap between adjacent ends of the parts and then moving such parts into coplanar relationship while, during the entire operation, maintaining the parts substantially parallel or longitudinally and without necessitating either part of the clamp being angularly positioned with respect to the other clamp part. Thus, by slightly loosening the worm connection so as to back off one part from the other and thus relieve tension in the band, unfastening or opening of the clamp may be effected at the point of interlock and the threaded connection between the worm and the adjacent clamp part may be preserved. Reinstallation of the clamp may subsequently be performed by simply reestablishing the interlock and again turning the worm in a band-contracting direction.

The provision of a worm drive clamp such as has briefly been outlined above, and possessing the stated advantages, constitutes the principal object of the present invention.

Other objects and advantages of the invention not at this time enumerated will readily suggest themselves as the nature of the invention is better understood from a consideration of the following detailed description.

The invention consists in the several novel features which are hereinafter set forth and are more particularly defined by the claims at the conclusion hereof.

In the accompanying two sheets of drawings forming a part of this specification, one embodiment of the invention is shown:

In these drawings:

FIG. 1 is a side elevational view of a two-part worm drive clamp constructed according to the present invention and showing the same in its closed or loop-forming condition preparatory to band-tensioning operations;

FIG. 2 is a plan view of the worm-equipped tensioning strip which is employed in connection with the invention and constitutes one of the two parts of the clamp;

FIG. 3 is a fragmentary plan view of a substantially continuous length of band-forming stock or material, limited selected portions of which are designed for interlocking cooperation with the tensioning strip of FIG. 2 in producing the present worm drive clamp;

FIG. 4 is a plan view showing the clamp of FIG. 1 in its fully extended or straightened position;

FIG. 5 is a fragmentary, exploded, perspective view illustrating schematically the manner in which a selected length of the band-forming stock of material of FIG. 3 is interlocked with the tensioning strip of FIG. 2 in end-to-end relationship;

FIG. 6 is a fragmentary perspective view similar to FIG. 5 but showing the parts in their interlocked relation;

FIG. 7 is an enlarged, fragmentary, circumferential or side view taken centrally through the closed clamp on the arc indicated by the line 7—7 of FIG. 1;

FIG. 8 is a sectional view taken substantially centrally and longitudinally through the structure which is shown in FIG. 7; and FIG. 9 is an enlarged, exploded, perspective view of the worm-equipped tensioning strip of FIG. 2 and illustrating schematically its relationship to the adjacent end of a length of the band-forming stock or material.

Referring now to the drawings in detail and in particular to FIGS. 1 to 3, inclusive, a worm drive clamp embodying the present invention is designed in its entirety by the reference numeral 10 and it is comprised of two separate and distinct parts 12 and 14 which are capable of being united in end-to-end fashion in order to produce a closed article-encircling band or strap such as is illustrated in FIG. 1. As will become apparent presently, the part 14 constitutes a tensioning part by means of which the clamp 10 as a whole may be tensioned and thus shrunk about the article which it is intended to encircle, while the part 12 is a filler part which constitutes the band or the predominant or main body of the clamp 10.

The part 12 of the clamp 10 comprises an elongated flexible metal strip 15 having a coupling tongue or tab 16 (see FIGS. 2, 3, 4, 8 and 9) at one end thereof. It also comprises a unitary worm assembly 18 which includes a slack take-up or tensioning worm proper 20 and is fixedly mounted on the other end of the strip 15. The part 12, considered as a whole, constitutes a worm-equipped tensioning member or part the function of which, when the worm 20 is turned in one direction, is to tension the band part 14 of the clamp about an article.

The part 14 of the two-part worm drive clamp 10 is in the form of a selected length of metal band-forming material or stock such as is illustrated in FIG. 3 and it may be cut, wrested or otherwise removed from a roll (not shown) of stock which preferably is carried in a conventional dispenser (also not shown). According to the present invention, predetermined lengths of the band-forming material or stock are employed for establishing the part 14, these lengths, as previously stated, being supplied in the form of a tandem or consecutive array of unit lengths L (see FIG. 3) which are contained in a roll of involutely-wound band-forming material or stock. Suitable pairs of notches 22 are formed in opposed relationship along the edges of the band-forming strip in order to facilitate breaking off of one or more unit lengths L as the same may be required for band-forming purposes. The particular band clamp 10 which has been selected for illustration herein employs a part 14 which is comprised of three of the unit lengths L and, accordingly, to produce such part 14 it is necessary merely to utilize the third pair of opposed notches 22 from the free end of the rolled strip of band-forming material or stock for break-off purposes.

Considering now one of the unit lengths L and referring particularly to FIGS. 3 and 4, such length is in the form of an elongated flexible strip having what will hereinafter be referred to as a leading end 24 and a trailing end 26. The term "leading end" is predicated upon the fact that such end is in the end of the unit length L which at one time or another becomes the free end of the rolled strip of band-forming material or stock, and also is the end which is fed to the worm assembly 18 as will be described subsequently. Each unit length L is formed with a keyhole-type cut-out or opening 30 in close proximity to its trailing end 26, and also with a longitudinal series of closely spaced slots 32 which extends inwards from the leading end 24 of the length L to a point close to the keyhole-type opening 30. These slots 32 extend generally transversely of the length L but are cut or punched at such an angle that they will conform to the helical thread of the band-tightening worm proper 20.

In order to assemble the two parts 12 and 14 for the purpose of producing the article-encircling clamp 10, the coupling tab 16 of the worm-equipped tensioning part 12 is interlocked with the keyhole-type opening 30 near the extreme trailing end of the strip part 14 as shown in FIG. 4, thus producing in effect a single strip or length of band-forming stock having at one end the worm assembly 18 and having at its other end a row or series of spaced worm-engaging slots 32, the first of which commences close to the leading end of the strip. Banding of the article to be encompassed by the clamp is accomplished by encircling the article with the thus assembled band clamp 10 and causing the leading end 24 of the band-forming strip to enter the housing of the worm assembly 18 where the worm proper 20 then engages the first of the series of slots 32 so that, upon turning of the worm in the proper direction, tensioning of the band clamp as a whole about the article takes place, all in a manner that will become readily apparent when the nature of the worm assembly 18 is better understood.

The worm assembly 20 of the clamp part 12 is of the general type which is shown and described in U.S. Pat. No. 3,087,220, granted on Apr. 30, 1963 and entitled "WORM DRIVE HOSE CLAMP," and no claim is made herein to any novelty therein. Briefly, such worm assembly involves in its general organization an upper housing part 40 (see FIG. 9), a lower housing part or saddle 42, the previously mentioned worm 20, and the adjacent end portion of the flexible metal strip 15 of the clamp part 12.

The upper housing part 40 is of cap-like design and includes a semi-cylindrical top wall 44, the lower side regions of which extend outwardly as indicated at 46 and then downwardly as at 48 in order to provide a pair of aprons. The upper housing part also has end walls 50 which have formed therein downwardly facing notches 52. The worm 18 is provided with a body portion having a helical thread 54. The ends of the body portion are rotatably journalled in the notches 52 in the end walls 50 of the upper housing part 40 and an enlarged head 56 with a diametric slot or kerf 57 is in its outer surface is provided on the worm and facilitates turning of the latter by means of a screwdriver or the like. The end of the flexible strip 15 which is remote from the tab 16 is interposed between the upper and lower housing parts 40 and 42 and is formed with a raised arcuate portion 58 having raised ramp portions 60 on the opposite ends thereof. A clearance slot 62 is formed in the raised arcuate portion 58. The lower housing part or saddle 42 underlies the arcuate portion 58 and is provided with upstanding tangs 64 which project upwards through slots 66 in the outwardly extending side regions 46 of the upper housing part 40 and are bent inwardly in order to lock the upper and lower housing parts together and confine the worm 18 therebetween. The manner in which the constituent parts of the worm assembly 18 are assembled on the strip 15 to produce the band clamp tensioning part 12 is fully described in aforementioned U.S. Pat. No. 3,087,220 and for a full understanding thereof reference may be had to such patent, the entire disclosure of which, insofar as it is consistent with or related to the present disclosure, is hereby made a part of the present application by reference thereto.

From the above description, it will be apparent that when the leading end 24 of the strip-like band-forming part 14 of the worm drive clamp 10 is introduced into the worm housing between the top housing part 40 and the strip 15 of the clamp part 12, such end will ride upwardly on the first-encountered raised ramp portion 60 and become engaged by the lower portion of the helical threada 54 of the worm 20 for band-tensioning purposes in the usual manner of operation of clamps of the particular character under consideration.

An important feature of the present inventon resides in the character of the interlock between the tab 16 on the outer end of the strip 15 of the clamp part 12 and the associated keyhole-type cut-out or opening 30 in the trailing end 26 of the band-forming part 14 of the clamp 10. The nature of this interlock is clearly shown in FIGS. 5 to 8, inclusive. Both the tab 16 and the cooperating keyhole-type opening 30 are especially designed so that the interlock may be effected without necessitating angular turning or displacement of either of the parts with respect to the other part in order to gain entry of the gab 16 into the opening 30, and also so that when the interlock is finally attained, and the clamp is tensioned for band-contracting purposes, a substantially smooth continuous inside surface in the vicinity of the interlock is attained.

Accordingly, and with particular reference to FIGS. 4 to 8, inclusive, the tab 16 is circular in configuration or contour, lies within the general plane of the strip 15, and is connected to the free or distal end of the latter by a raised offset portion 70. The inner end of the offset portion 70 is connected to said free or distal end of the strip 15 by an inclined full width section 72 while the outer end of the offset portion 70 is connected to the circular tab 16 by an inclined narrow neck 74. As illustrated in the drawings, the tab 16, the neck 74, the raised portion 70, the full width section 72, and the strip 15 are formed integrally with one another. The strip 15, except for the raised arcuate portion 58 and the ramp portions 60, is planar throughout and, except for the clearance slot 62 in its raised arcuate portion 58, is imperforate. The keyhole-type opening 30 adjacent to the trailing end 26 of the band-forming part 14 of the clamp 10 embodies a narrow rectangular trailing portion 76 and a relatively wide circular leading portion 78, the diameter of the latter being slightly greater than that of the tab 16. A transverse bridge portion 80 extends across and closes the trailing end of the narrow trailing portion of the opening 30 and forms an integral part of the trailing end 26 of the band-forming clamp part 14. The width of the neck 74 of the tab 16 is slightly less than the width of the narrow rectangular portion 76 of the keyhole-type opening 30.

From the above description, it will be apparent that the contour of the tab 16 and of the keyhole type opening 30 is such that when it is desired to effect an interlock between the two clamp parts 12 and 14, the opposing ends of these two parts may be juxtapositioned so that the tab 16 of the part 12 directly overlies and is in vertical register with the circular portion 78 of the opening 30. Thereafter, the part 12 is moved bodily inwards toward the general plane of the clamp part 14 so that the tab 16 enters and passes in a sidewise manner completely through the circular portion 78 of said keyhole-type opening 30, after which the part 12 may be pulled longitudinally to cause the narrow neck 74 of the tab 16 to move within the confines of the narrow rectangular portion 76 of the opening 30, while at the same time, the aforementioned bridge portion 80 (see FIG. 5) which separates the keyhole-type opening 30 from the extreme trailing end edge of the band-forming part 14 moves into face-to-face coextensive contact with the underneath side of the offset portion 70 as shown in FIG. 8. Also in connection with longitudinal pulling of the clamp part 12 with respect to the clamp part 14, the inner or leading edge of the bridge portion 80 moves into firm engagement with the inner side of the narrow neck 74 of the tab 16 and the side portions or segments of the tab are caused to move under and into interlocked relation with the portions of the band-forming part 14 which define the outer side portions of the circular portion 78 of the opening 30. With the part 12 thus assembled and coupled in subtantial end-to-end relationship with respect to the clamp part 14, the interlock which exists between the parts is such that the clamp 10 may be subjected to a considerable degree of tension without causing separation of its two parts or principal components.

When it is desired to apply a strip-like band-forming part 14 of the clamp 10 to any given article, the circumference of such article will first be considered and then the number of unit lengths L of the band-forming material of stock which will be required in order completely to encircle the article will be estimated. For example, if the clamp 10 is to be used as an automotive hose clamp for the tubing which is associated with a water heater or with an air conditioning unit, ordinarily the use of a single length L of the band-forming material or stock will suffice for constructing or forming the clamp part 14. Where, however, much larger tubing is encountered, usually two unit lengths L of the band-forming material or stock may be wrested from the roll so as to serve as the clamp part 14. Where still larger tubing is concerned, or where an article such as a carton or box is to be banded or strapped, three or more unit lengths L may be detached from the roll of band-forming material or stock.

After the proper estimate has been made of the number of lengths L to form the clamp part 14, such part is wrested or broken from the roll by selecting the proper pair of opposed notches 22 and then working the adjacent length L back and forth rapidly until fracture takes place, thus freeing the desired number of lengths L to be used from the roll of band-forming material or stock. Thereafter, the worm-equipped tensioning part 12 of the clamp 10 is applied to the leading end 26 of the severed clamp part 14 by effecting a tab and opening interlock in the manner previously described. At the conclusion of the attaching or coupling operation, the two clamp parts 12 and 14, now united, are caused to encircle the article undergoing banding, and then the extreme outer portion of the leading end 24 of the band-forming clamp part 12 is manipulated into its operative position with respect to the work assembly 18 of the clamp part 12 as previously set forth. After the aforementioned steps, it is contemplated that the worm 20 will be turned in a tightening direction in order to shrink the band which is formed by the clamp part 14 upon the article.

Once a given installation of the worm drive clamp 10 has been effected, it is not contemplated that the clamp need again be dismantled. If, as in the case of a radiator hose connection, it is necessary to install a new radiator hose, the installation may be made, utilizing the same clamp 10 without the necessity of disconnecting the part 12 from the part 14. However, under certain circumstances, as, for example, if a given assembled worm drive clamp 10 is to be reused on a smaller object and it is found that such smaller object requires a lesser number of lengths L of the band-forming material or stock, then by unthreading the endmost length L from the worm assembly 18, such length may be wrested from the remaining lengths L of the clamp part 14 and the clamp re-applied to the smaller object without disconnecting the clamp parts 12 and 14. If a given clamp 10 is to be reused on a larger article, it is then necessary to disconnect the two clamp parts 12 and 14 and substitute a longer multi-length clamp part 14 for the original clamp part.

At this point, it is to be noted from an inspection of FIGS. 3 and 4 that each pair of aligned break-off notches 22 is in direct transverse alignment with one of the transverse worm-engaging slots 32. Thus, when a length L is wrested from the roll of band-forming material stock, the fracture takes place in the vicinity of the aligned slot which, by reason of the fracture, is destroyed, thus leaving only two relatively small fracture regions on the leading end of the removed length. This, of course, is conducive toward ease and uniformity of fracture.

There are certain special circumstances where the present two-part worm drive clamp 10 offers a distinct advantage over conventional multi-part clamps. One such circumstance is where the improved clamp is used as a hose clamp in a location where tight quarters are involved and it is necessary completely to remove the clamp before the hose can be removed for replacement purposes. Frequently, when working in such tight quarters and after a fresh hose has been installed, the reapplication of a clamp to the fresh hose presents a problem in that it is difficult to align the free end of the band part of the clamp with the entrance slot leading to the worm housing and at the same time turn the worm so that it will initially seize the inserted leading end of the band part. In other words, it is difficult to get the helical thread of the worm started on said leading end of the band part. In connection with the present multi-length band-forming part 14 where there is the tab and opening interlock 16, 30 between it and the clamp part 12, it is not necessary completely to unfasten or detach the band-forming part 14 from the worm assembly 18 of the clamp part 12. Instead, the worm may be slackened to such an extent that it is possible to unfasten or disconnect the interlock (tab 16 and opening 30) instead of unfastening or disconnecting the leading end of the clamp part 14 from the worm assembly 18 of the clamp part 12. Then, after a new hose has been installed, the band clamp may be reapplied by restoring the interlock between the trailing end 26 of the clamp part 14 and the outer or distal end of the strip 15 of the clamp part 12, after which the worm and slot connection 20, 32 between the two clamp parts, still intact, may again be tightened.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is the same to be limited.

Having thus described the invention what I claim as new and desire to secure by letters patent is:

1. A two-part worm drive clamp comprising a tensioning part consisting of a comparatively short flexible strip having one end thereof terminating in a coupling tab which is of circular configuration and has an inclined narrow neck portion at its inner region, and a tensioning worm rotatably mounted on the other end of said strip, and a flexible band-forming part in the form of ribbon-like strip stock having leading and trailing ends, said band-forming part being provided adjacent to its trailing end with a tab-receiving opening which is designed for interlocking with said tab, is of keyhole configuration, and includes a relatively narrow rectangular trailing portion and a relatively wide circular leading portion the diameter of which is slightly in excess of the diameter of the tab in order that said tab may be passed sidewise through said circular leading portion of the tab-receiving opening, the width of the trailing portion of the opening being such as closely to confine said inclined narrow neck portion when the band-forming part is tensioned about an article, said band-forming part being provided with a longitudinal series of spaced apart transverse slots extending inwardly from its leading end, and said leading end of the band-forming part being designed for cooperation with said worm whereby rotation of the worm will effect engagement thereof with said transverse slots to tension the clamp about the article.

2. A two-part worm drive clamp as set forth in claim 1 and wherein the coupling tab lies in the general plane of the strip of the tensioning part and its inclined narrow neck portion is connected to said tensioning part strip by an outwardly displaced offset, and the tab-receiving opening is separated from the trailing end of the band-forming part by a narrow web which lies in the common plane of the coupling tab and strip and also lies flush against the inner side of the offset.

3. A long length or roll of substantially continuous, ribbon-like, flexible, band-forming stock designed primarily for use in forming the band-forming part of a two-part worm drive clamp of the type that comprises a tensioning part consisting of a comparatively short flexible strip having a coupling tab at one end thereof and a tensioning worm rotatably mounted on the other end of said strip, and an elongated, flexible, band-forming part adapted to have its ends joined in end-to-end fashion to the tensioning part in order to complete the clamp, said band-forming stock being of one-piece character and designed to be severed into single or multiple lengths in order to form the band-forming part of the clamp of any desired length, said stock having visual means dividing it into unit lengths for selective severing purposes, each unit length having a leading end and a trailing end and being provided with a tab-receiving opening adjacent to its trailing end and a longitudinal series of spaced apart, transversely extending slots extending inwards from its inner end, the tab-receiving slot of any unit length being designed for interlocking relation with the tab on the one end of the strip of the tensioning part of the clamp and the leading end of any unit length being designed for cooperation with the worm whereby rotation of the worm will effect engagement thereof with its transverse slots for band-tensioning purposes.

4. Band-forming stock according to claim 3 and wherein the tab-receiving opening in the trailing end of each unit length is of keyhole configuration and comprises a relatively narrow trailing portion and a relatively wide leading portion.

5. Band-forming stock ase set forth in claim 4 and wherein the relatively narrow trailing portion of each keyhole tab-receiving opening is of rectangular configuration and the relatively wide leading portion of such opening is of circular configuration.

6. Band-forming stock as set forth in claim 3 and wherein the visual means for dividing it into unit lengths is in the form of pairs of oppositely disposed notches which are formed in the edges of the stock in alignment with the frontmost slots of the longitudinal series of slots.

* * * * *